United States Patent [19]
Fechter

[11] Patent Number: 5,632,568
[45] Date of Patent: May 27, 1997

[54] AUTOMATIC UNCOCKING SHAFT SENSING COUPLER

[75] Inventor: Mark A. Fechter, West Bend, Wis.

[73] Assignee: Weasler Engineering, Inc., West Bend, Wis.

[21] Appl. No.: 582,243

[22] Filed: Jan. 3, 1996

[51] Int. Cl.⁶ .................................................. F16B 7/00
[52] U.S. Cl. .......................... 403/328; 403/325; 403/326; 403/359
[58] Field of Search ........................... 403/359, 321, 403/322, 325, 326, 327, 328, 316, 317, DIG. 4

[56] References Cited

U.S. PATENT DOCUMENTS

| | | | |
|---|---|---|---|
| 2,673,450 | 3/1954 | Scheiwer | 285/169 |
| 3,179,450 | 4/1965 | Recker | 287/53 |
| 3,240,519 | 3/1966 | Weasler | 287/119 |
| 3,260,541 | 7/1966 | Sadler et al. | 287/53 |
| 3,480,310 | 11/1969 | McElwain | 287/119 |
| 3,551,013 | 12/1970 | Trojanowski et al. | 287/119 |
| 3,678,439 | 7/1972 | Vetter | 339/46 |
| 3,747,966 | 7/1973 | Wilkes et al. | 287/119 R |
| 3,796,502 | 3/1974 | Federspiel | 403/106 |
| 3,822,951 | 7/1974 | Bornzin | 403/322 X |
| 3,849,007 | 11/1974 | Recker | 403/27 |
| 3,929,343 | 12/1975 | Wanner et al. | 403/317 X |
| 3,969,033 | 7/1976 | Recker | 403/322 |
| 3,990,550 | 11/1976 | Recker | 192/46 |
| 3,992,119 | 11/1976 | Recker | 403/316 |
| 3,992,120 | 11/1976 | Recker | 403/317 |
| 4,125,337 | 11/1978 | Recker | 403/11 |
| 4,198,080 | 4/1980 | Carpenter | 285/277 |
| 4,283,158 | 8/1981 | Takahata | 403/322 |
| 4,289,414 | 9/1981 | Recker | 403/12 |
| 4,318,630 | 3/1982 | Herchenbach et al. | 403/322 |
| 4,392,759 | 7/1983 | Cook | 403/317 X |
| 4,402,626 | 9/1983 | Recker | 403/328 |
| 4,523,871 | 6/1985 | Recker | 403/12 |
| 4,579,476 | 4/1986 | Post | 403/322 |
| 4,603,998 | 8/1986 | Bober et al. | 403/322 |
| 4,616,952 | 10/1986 | Schott | 403/316 |
| 4,639,162 | 1/1987 | Geisthoff et al | 403/316 |
| 4,639,163 | 1/1987 | Buthe et al. | 403/322 |
| 4,645,372 | 2/1987 | Suzuki | 403/325 |
| 4,859,110 | 8/1989 | Dommel | 403/325 |
| 4,900,181 | 2/1990 | Geisthoff | 403/322 |
| 4,957,387 | 9/1990 | Nasu | 403/322 |
| 4,960,344 | 10/1990 | Geisthoff et al. | 403/316 |
| 5,522,669 | 6/1996 | Recker | 403/325 X |

FOREIGN PATENT DOCUMENTS 115626   9/1980   Japan ............................ 403/325

OTHER PUBLICATIONS

Applicant's Exhibit A, Walterscheid QS Gelenkwellenverschluss, admitted prior art.

Primary Examiner—Kenneth J. Dorner
Assistant Examiner—Harry C. Kim
Attorney, Agent, or Firm—Quarles & Brady

[57] ABSTRACT

A coupling for axially fixing a hub on a shaft has locking members slidable in slots of the hub and which are engaged in recesses in the shaft by a collar which holds the locking members in the recesses so as to fix the hub axially on the shaft. In a released position, a shoulder on the collar catches behind a ledge formed on the hub, but only when the shaft is removed from the hub. When the shaft is in the hub, it cams against uncocking members in the form of balls which prevent the collar from being tilted so as to engage the collar shoulder with the ledge on the hub.

7 Claims, 3 Drawing Sheets

AUTOMATIC UNCOCKING SHAFT SENSING COUPLER

FIELD OF THE INVENTION

This invention relates to a coupling for removable axial locking of a hub on a shaft.

BACKGROUND OF THE INVENTION

Couplings for removably locking a hub axially on a shaft are well known. The hub may mount another shaft to which the removable connection is to be made or may mount, for example, the yoke of a universal joint.

Any application in which one member needs to be mounted co-axially and axially locked on a rotary power shaft may require such a coupling. For example, one common application of such a coupling is in connecting the power input shaft of an agricultural implement to the power takeoff shaft of a tractor. In this case, the hub typically mounts the yoke of a universal joint and is internally splined to match the external splines on the tractor's power take-off shaft, so as to establish a rotary power transmissive coupling between the hub and the power take-off shaft.

The hub is typically locked onto the shaft by locking members which are slidable in radially extending slots through the hub so as to engage a circumferential recess or raceway in the splined power take-off shaft of the tractor. A collar around the outside of the hub is biased into a locking position by a spring so as to prevent the locking members from backing out of the raceway in the shaft.

An example of such a coupling is disclosed in U.S. Pat. No. 4,900,181. In the coupling disclosed in this patent, a stop is formed in the collar which extends radially inwardly so that the collar can be tilted so that the stop comes to rest against another stop which is formed on the hub. When the locking elements are urged radially outwardly by engagement with the shaft when the shaft is inserted into the hub, the locking members center the collar so as to disengage the two stops and allow the collar to move into the locked position under the bias of a spring. However, when in the locked position, the collar can be moved therefrom to be locked in the disengaged position, even though the shaft is fully inserted in the hub, with the locking members engaged in the raceway. Thus, with this design, the coupling may appear to be in the locked position with the shaft fully inserted in the hub, when in fact the collar is locked in the disengaged position.

SUMMARY OF THE INVENTION

The invention provides a coupling for axially locking a hub to a shaft which cannot be locked in the released position when the shaft is fully inserted in the hub, i.e., when the locking members are engaged in the raceway of the spline shaft. The coupling has a locking member received in a radially extending slot in the hub for radial sliding movement therein into or out of a recess formed in the shaft. A collar is slidable on the hub between a locked position in which the collar prevents radial outward movement of the locking member and a released position in which the collar permits radial outward movement of the locking member in the slot. The collar is biased into the locking position and has a radially inwardly extending shoulder, the hub having a radially outwardly extending ledge so that the collar may be cocked at an angle to engage the shoulder with the ledge to hold the collar in the released position. The invention provides the improvement in this construction wherein uncocking members are provided in a corresponding number of slots in the hub. Each uncocking member is slidable radially in its corresponding slot between a radially inward cocked position and a radially outward uncocked position. From the cocked position, radial outward movement of the uncocking members by engagement with the shaft disengages the shoulder from the ledge. The presence of the shaft in the hub inside of the uncocking members maintains the uncocking members in the uncocked position so that the shoulder of the collar cannot be caught on the ledge of the hub while the shaft is fully inserted in the hub. In a preferred form, uncocking is accomplished by centering the collar on the hub with at least three angularly spaced uncocking members.

DETAILED DESCRIPTION OF THE PREFERRED EMBODIMENTS

Figure 1:
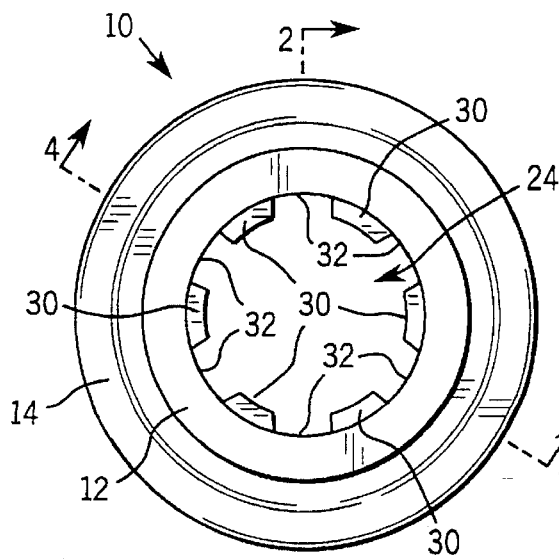
FIG. 1 is an end plan view of a coupling of the invention.

Referring to FIGS. 1–6, a coupling 10 of the invention includes a hub 12 and a collar 14 slidable on the hub. The collar 14 is biased to a locked position, which is the position shown in FIGS. 7 and 8, by a spring 16 which acts between a lip 18 of the hub and a lip 20 of the collar 14. A snap ring 22 is received in a circumferential groove at the front of the hub 12 which prevents the collar 14 from being pushed off the front end of the hub 12 by the spring 16.

The bore 24 of the hub 12 is internally splined and a shaft 26 for fitting into the bore 24 is externally splined to mate with the splines of the bore 24. As is well known, the splines in the bore 24 are made up of an alternating series of lands 30 and recesses 32. The splines on the shaft 26 are also made of an alternating series of lands 34 and recesses 36 around the circumference of the shaft 26. The lands of the shaft 26 fit into the recesses of the bore 24 and the lands of the bore 24 fit into the recesses of the shaft 26, when the shaft 26 is inserted into the bore 24.

A circumferential groove 28 is formed around the periphery of the shaft 26 spaced from the end of the shaft 26. Two locking members 40 are received in corresponding slots 42 formed in the hub 12, each of which are angularly positioned to correspond to be angularly aligned with a recess 32 of the splines in the bore 24. The locking members 40 are radially slidable in the slots 42 so that the locking members 40 may slide into or out of the groove 28 when the groove 28 is positioned at the axial position of the locking members 40.

Figure 7:
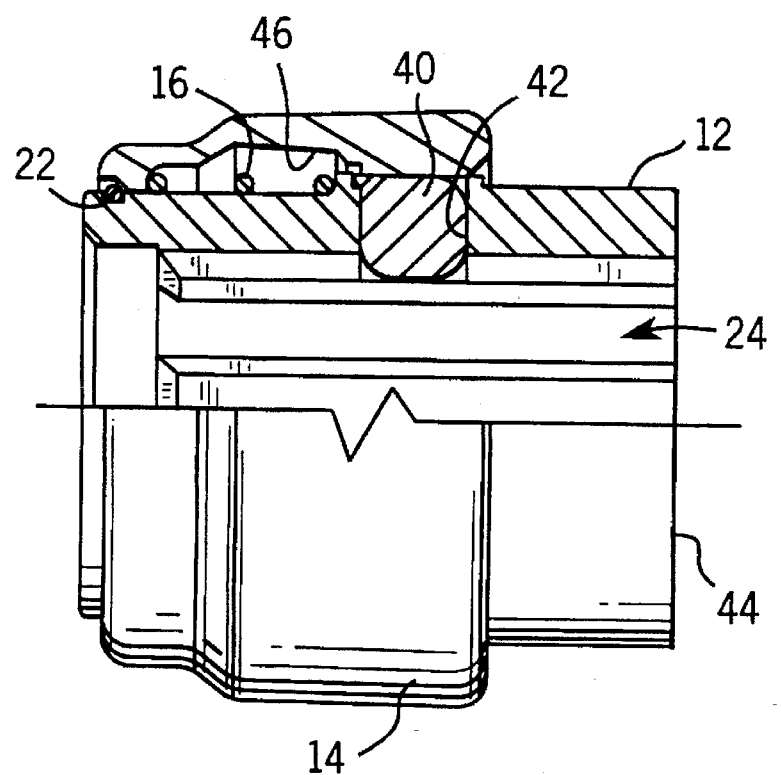
FIG. 7 is a partial cross-sectional view similar to FIG. 2 (from the plane of the line 2—2 of FIG. 1) but showing the coupling in the locked position.
Figure 8:
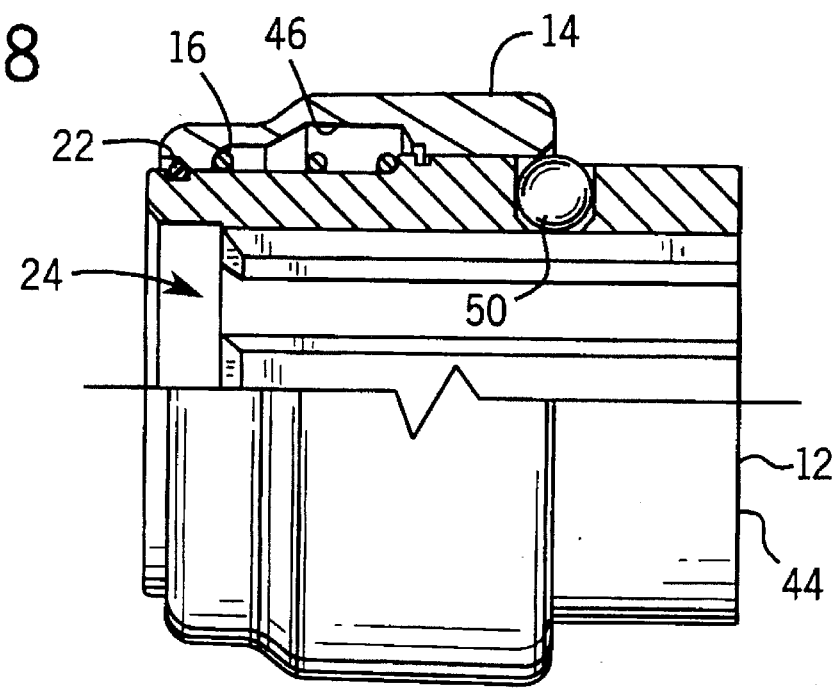
FIG. 8 is a partial cross-sectional view similar to FIG. 4 (as viewed from the plane of the line 4—4 of FIG. 1) but showing the coupling in the locked position.

When the locking members 40 are received in the groove 28 and held therein by the collar 14 being in the locked position shown in FIGS. 7 and 8, the shaft 26 can neither be pushed further into the hub 12 or axially removed therefrom. Conversely, when the collar 14 is moved to the released position shown in FIGS. 2 and 4, the locking members 40 are able to slide radially outwardly in the slots 42 into the undercut 46 formed in the collar 14, so as to allow the locking members 40 to cam up out of the slot 28 when the shaft 26 is removed from the bore 24.

As is well known, a yoke, shaft, or other member to which the shaft 26 is to be connected would be fixedly secured to the rear end 44 of the hub 12. Such securement may be by bolting, welding, casting or any other suitable means.

Figure 2:
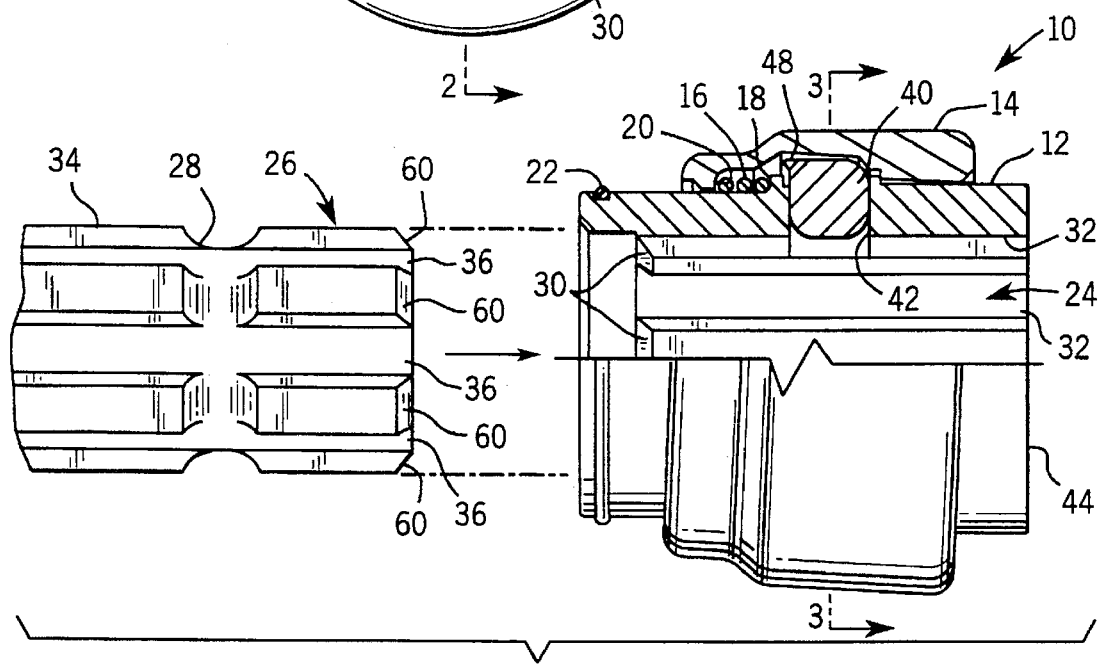
FIG. 2 is a partial cross-sectional view of the coupling of FIG. 1 as viewed from the plane of the line 2—2 of FIG. 1 showing the coupling in the released position and also illustrating a spline shaft for insertion into the coupling.
Figure 3:
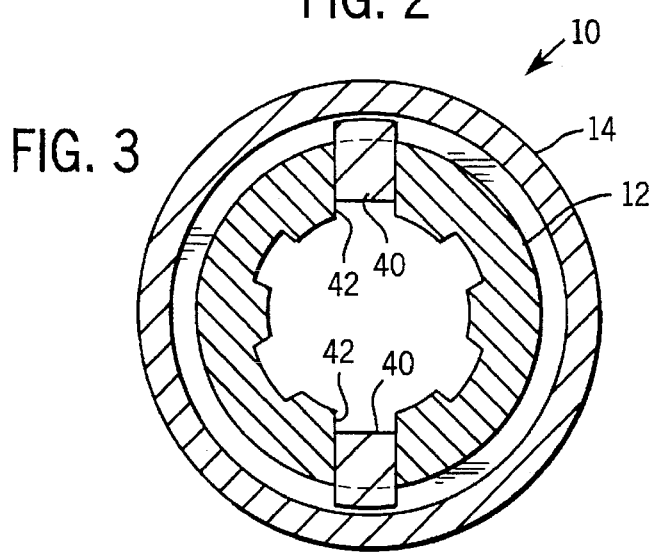
FIG. 3 is a cross-sectional view as viewed from the plane of the line 3—3 of FIG. 2.
Figure 4:
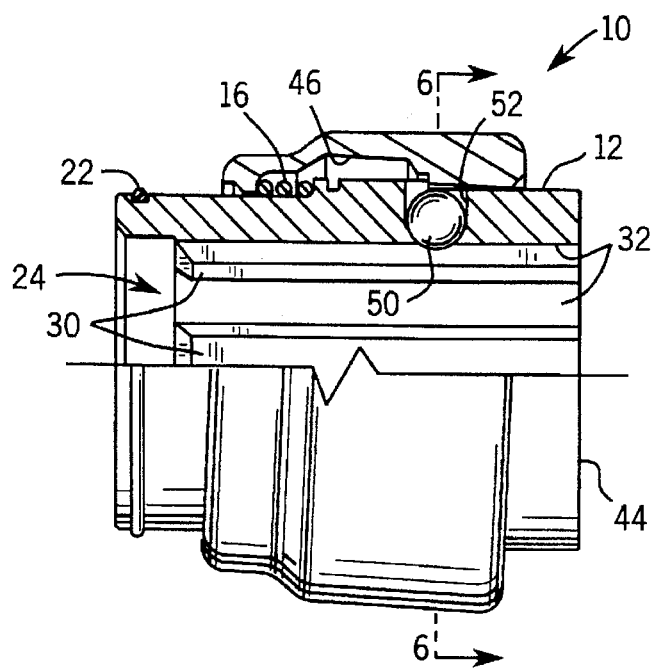
FIG. 4 is a partial cross-sectional view as viewed from the plane of the line 4—4 of FIG. 1 showing the coupling in the released position.

The locking members 40 are each in the shape shown in FIGS. 2 and 3, but may be other shapes, e.g., a ball, so as to fit within the slot 28 and be able to cam up out of the slot 28 when the collar 14 is in the released position shown in FIGS. 2 and 4 and the shaft 26 is pulled out of the hub 12. As is conventional, the locking members are preferably rounded on the bottom as shown, as is the groove 28, to facilitate the camming up of the members 40 out of the slot 28 upon removal of the shaft 26. Each locking member 40 has an ear 48 which prevents the corresponding locking member 40 from falling radially inward through the slot 42 when the shaft 26 is removed from the bore 24.

Figure 5:
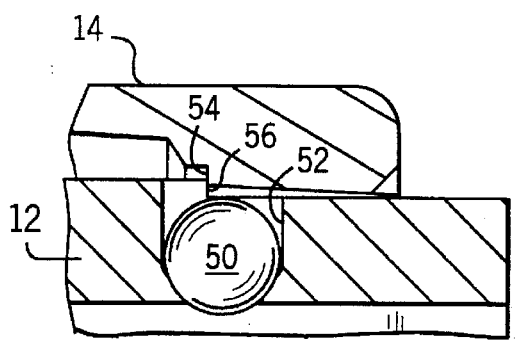
FIG. 5 is a detail view of a portion of FIG. 4.
Figure 6:
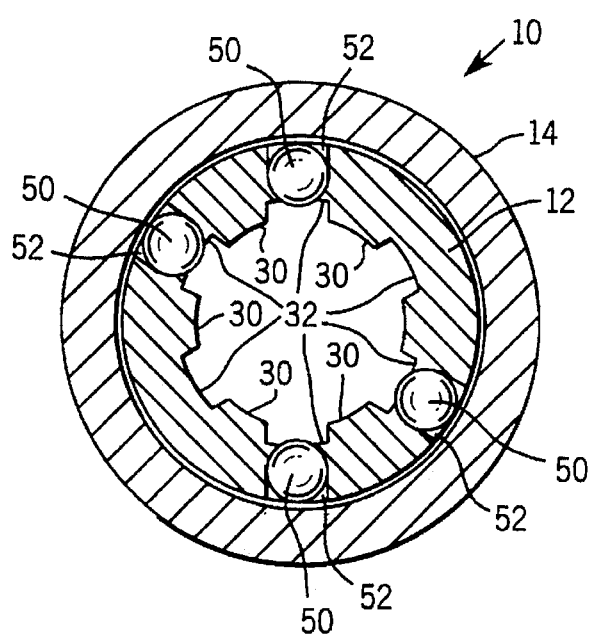
FIG. 6 is a cross-sectional view as viewed from the plane of the line 6—6 of FIG. 4.

Referring to FIGS. 4–6, four uncocking members 50, each in the form of a ball, are received in four corresponding holes 52 in the hub 12, at a radial plane (represented by line 6—6 of FIG. 4) which is axially somewhat behind the radial plane (represented by line 3—3 of FIG. 2) of the locking members 40. Each uncocking member 50 and corresponding hole 52 is angularly positioned in registration with a recess 32 of the splined bore 24. Each hole 52 is of a reduced diameter at its radially inward end to prevent the uncocking members 50 from falling radially inward into the bore 24 when the shaft 26 is removed from the bore 24. There is sufficient clearance between each uncocking member 50 and its corresponding hole 52 to allow the uncocking members 50 to move freely radially inward or outward in the holes 52.

Somewhat axially forward of the radial plane of the uncocking members 50, an exterior circumferential ledge 56 is formed around the periphery of the hub 12. An inner circumferential shoulder 54 is formed on the collar 14 facing in the opposite direction from the ledge 56 so that, when in the released position shown in FIGS. 2 and 4, the shoulder 54 can be engaged in abutting relationship with the ledge 56. This is accomplished by cocking the collar 14 at a slight angle as shown in FIGS. 2 and 4 so as to catch the shoulder 54 against the ledge 56. This can only be accomplished when the shaft 26 is removed from the bore 24, since with the shaft 26 inside the bore, interference between the shaft 26 and the uncocking members 50 prevents cocking of the collar 14.

When the collar 14 is cocked or tilted at an angle as shown in FIGS. 2 and 4, at least one of the uncocking members 50 will be restrained in movement in its corresponding hole 52 so that when its radially outer periphery touches the collar 14, its radially inner periphery extends slightly into the bore 24. The ledge 56 is sized so that the diameter of the ball is at least equal to the distance from the wall of the bore 24 into which the hole 52 opens to the radially outer edge of the ledge 56. Thus, when the shaft 26 is inserted into the bore 24, the lands 34 of the shaft 26 cam the uncocking member 50 radially outwardly, and the uncocking member 50 thereby push outwardly against the collar 14 to move the shoulder 54 outwardly beyond the edge of the ledge 56. This camming of the uncocking members 50 radially outwardly is facilitated by the beveled ends 60 of the lands 34, as are conventionally found in splined shafts.

In effect, the uncocking member 50 center the collar 14 relative to the hub 12, which releases the shoulder 54 from the ledge 56 to allow the spring 16 to move the collar 14 leftwardly (toward the front of hub 12) as viewed in FIGS. 2 and 4. Such leftward movement is restrained, however, until the groove 28 becomes aligned with the locking members 40, so the locking members can be cammed radially inwardly by the collar 14 into the groove 28.

Thus, upon insertion of the shaft 26 into the bore 24, the uncocking members 50 are initially cammed outwardly to disengage the collar out of the released position shown in FIGS. 2 and 4, following which upon further insertion of the shaft 26 into the bore 24, the locking members 40 become axially aligned with the groove 28 and are cammed by the collar 14 radially inwardly to seat in the groove 28 as shown in FIGS. 7 and 8. In this position, the shaft 26 is locked in the axial position relative to the hub 12.

In FIGS. 7 and 8, the shaft is not drawn in for clarity. However, it is noted that the uncocking members 50 are held in the radially outer position shown in FIG. 8, by being supported on the lands 34 of the shaft 26, which prevents the collar 14 from being cocked in the released position. The uncocking members are held in this outward position whenever the shaft 26 is inside the bore 24 at the axial position of the uncocking members 50.

In the coupling 10, the collar 14 is left free spinning at all times, the ledge 56 and shoulder 54 extending for 360°. In addition, the ledge 56 and shoulder 54 can be engaged at any position around their 360° extent, so that the collar 14 can be cocked at any such position.

Many modifications and variations to the preferred embodiment described will be apparent to those skilled in the art. For example, any number of locking members could be used and any number of uncocking members could be used. However, it is preferred to use at least three uncocking members to ensure proper centering of the collar 14 when the shaft is inserted into the bore 24. Therefore, the invention should not be limited to the embodiments described, but should be defined by the claims which follow.

I claim:

1. In a coupling for axially locking a hub to a shaft of the type having a locking member received in a radially extending slot in the hub for radial sliding movement therein into or out of a recess formed in the shaft and a collar slidable on said hub between a locked position in which said collar prevents radial outward movement of said locking member in said slot and a released position in which said collar permits radial outward movement of said locking member in said slot, said collar being biased into said locking position and having a radially inwardly extending circumferential shoulder, said hub having a radially outwardly extending circumferential ledge so that said collar may be cocked at an angle to engage said shoulder with said ledge to hold said collar in said released position, the improvement wherein:

a plurality of uncocking members are provided in a corresponding plurality of slots in said hub, each said uncocking member being slidable radially in its corresponding slot between a radially inward cocked position and a radially outward uncocked position, wherein radial outward movement of said uncocking members against said collar from said cocked position by engagement with said shaft disengages said shoulder from said ledge.

2. The improvement of claim 1, wherein said radial outward movement of said uncocking members centers said collar on said hub.

3. The improvement of claim 1, wherein said uncocking members in said uncocked position prevent locking said collar in said released position.

4. The improvement of claim 1, wherein said uncocking members are balls.

5. The improvement of claim 1, wherein there are at least three of said uncocking members spaced around the circumference of said hub.

6. The improvement of claim 1, wherein there are four of said uncocking members spaced around the circumference of said hub.

7. The improvement of claim 1, wherein said uncocking members are positioned angularly in registration with spline grooves in said hub.

* * * * *